(12) United States Patent
Sprenger et al.

(10) Patent No.: US 11,073,382 B2
(45) Date of Patent: Jul. 27, 2021

(54) ERROR COMPENSATION FOR COORDINATE MEASURING MACHINES USING A REFERENCE MODULE

(71) Applicant: HEXAGON TECHNOLOGY CENTER GMBH, Heerbrugg (CH)

(72) Inventors: Bernhard Sprenger, Widnau (CH); Claudio Iseli, Au (CH); Bo Pettersson, Luxembourg (LU)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 492 days.

(21) Appl. No.: 15/775,119

(22) PCT Filed: Nov. 13, 2015

(86) PCT No.: PCT/EP2015/076529
§ 371 (c)(1),
(2) Date: May 10, 2018

(87) PCT Pub. No.: WO2017/080612
PCT Pub. Date: May 18, 2017

(65) Prior Publication Data
US 2018/0328705 A1 Nov. 15, 2018

(51) Int. Cl.
*G01B 21/04* (2006.01)
*G01B 5/008* (2006.01)
*G01D 5/347* (2006.01)

(52) U.S. Cl.
CPC .......... *G01B 21/042* (2013.01); *G01B 5/008* (2013.01); *G01B 21/045* (2013.01); *G01D 5/34746* (2013.01)

(58) Field of Classification Search
CPC .... G01B 21/042; G01B 21/04; G01B 21/045; G01B 21/20; G01B 11/005; G01B 5/008;
(Continued)

(56) References Cited

U.S. PATENT DOCUMENTS

| 4,932,131 A * | 6/1990 | McTurtry ........... G01B 5/0009 33/1 M |
| 8,950,078 B2 * | 2/2015 | Engel .................... G01B 21/042 33/503 |

(Continued)

FOREIGN PATENT DOCUMENTS

| CN | 102686974 A | 9/2012 |
| CN | 103968789 A | 8/2014 |

(Continued)

*Primary Examiner* — Jeffrey P Aiello
(74) *Attorney, Agent, or Firm* — Maschoff Brennan

(57) ABSTRACT

A method of compensating errors in a coordinate measuring machine adapted for determination of at least one spatial coordinate of a measurement point on an object to be measured. The method comprises measuring a distance from the first reference element to the first structural component, wherein the measured distance indicates a displacement or a deformation of the first structural component, defining a dynamic model with a first set of state variables, the state variables being related to a set of physical properties of the reference module and representing an actual state of the reference module, deriving the actual state of the reference module by a calculation based on the dynamic model, and deducing compensation parameters based on the actual state.

21 Claims, 4 Drawing Sheets

(58) Field of Classification Search
CPC .............. G01D 5/34746; G01R 35/00; G05B 2219/37193; G01C 17/38; B25J 9/1692
USPC ........ 33/503; 73/1.01; 702/94–95, 104, 141, 702/150, 155, 167–168
See application file for complete search history.

(56) References Cited

U.S. PATENT DOCUMENTS

| | | | | |
|---|---|---|---|---|
| 2007/0051179 A1* | 3/2007 | McMurtry | ............ | G01B 21/045 73/760 |
| 2007/0144022 A1* | 6/2007 | MacManus | ............ | G01B 21/045 33/503 |
| 2008/0040942 A1* | 2/2008 | Eales | ............ | G01D 5/34 33/707 |
| 2009/0326849 A1* | 12/2009 | MacManus | ............ | G01B 21/042 702/95 |
| 2011/0013199 A1* | 1/2011 | Siercks | ............ | G01B 11/007 356/615 |
| 2011/0175745 A1* | 7/2011 | Atwell | ............ | G05B 19/406 340/665 |
| 2012/0041712 A1* | 2/2012 | Pettersson | ............ | G01B 5/008 702/151 |
| 2012/0084989 A1* | 4/2012 | Pettersson | ............ | G01B 21/045 33/503 |
| 2012/0246953 A1* | 10/2012 | Engel | ............ | G01B 21/045 33/502 |
| 2013/0036619 A1* | 2/2013 | Ruck | ............ | G05B 19/401 33/503 |
| 2013/0124135 A1* | 5/2013 | Chang | ............ | G01B 5/012 702/121 |
| 2014/0222372 A1* | 8/2014 | Sprenger | ............ | G06F 30/23 702/155 |
| 2014/0222373 A1* | 8/2014 | Sprenger | ............ | G01B 5/008 702/155 |

FOREIGN PATENT DOCUMENTS

| | | |
|---|---|---|
| CN | 103968790 A | 8/2014 |
| DE | 10 2013 216093 A1 | 2/2015 |
| EP | 0 182 394 A2 | 5/1986 |
| EP | 1 559 990 A2 | 8/2005 |
| EP | 1 687 589 A1 | 8/2006 |
| EP | 2 219 010 A1 | 8/2010 |
| EP | 2 762 830 A1 | 8/2014 |

\* cited by examiner

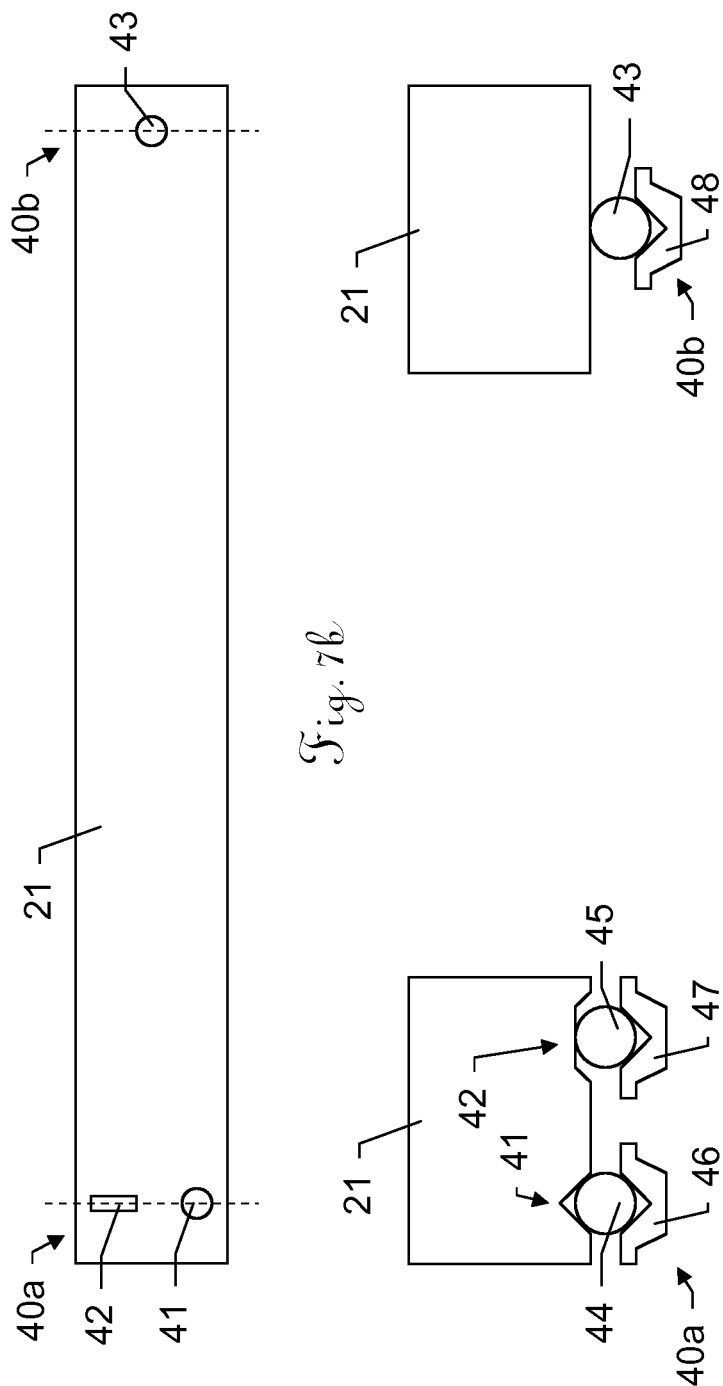

ERROR COMPENSATION FOR COORDINATE MEASURING MACHINES USING A REFERENCE MODULE

FIELD OF THE INVENTION

The present invention generally pertains to approaches for compensations of errors occurring by movement or external influences on a measuring device, in particular of a coordinate measuring machine, to a simpler calibration of such measuring device and to respective devices being adapted for proving such an approach.

BACKGROUND

It is common practice to inspect work pieces subsequent to production on a coordinate positioning apparatus, such as a coordinate measuring machine (CMM), in order to check for correctness of predefined object parameters, like dimensions and shape of the object.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probe) carried by the probe head.

In a simple form of the machine a suitable transducer mounted parallel to each axis is able to determine the position of the probe head relative to a base of the machine and, therefore, to determine the coordinates of a measurement point on the object being approached by the sensor. For providing movability of the probe head a typical coordinate measuring machine may comprise a frame structure on which the probe head is arranged and driving means for moving frame components of the frame structure relative to each other.

For measuring surface variations, both measurement principles based on use of tactile sensors and of optical sensors are known.

In general, to provide a coordinate measuring machine with an improved measurement precision, its frame structure is therefore usually designed to have a high static stiffness. In order to achieve a stiff and rigid machine design, the frame structure or at least parts of it, is often made of stone, such as granite. Besides all the positive effects like thermal stability and good damping properties, the granite also makes the machine and the movable frame elements quite heavy. The high weight on the other side also requires high forces for a decent acceleration.

There are still several possible sources of error, if such technique is employed. Resonances or vibrations of machine parts when moving one frame component relative to another component are just two examples for dynamic errors. Moreover, errors emerging from vibrations coming from outside the machine are to be considered. Additionally, static errors like lack of straightness in movement and of orthogonality of the axes or lateral offset in the linear drive mechanisms may occur. As well, drift effects, such as temperature drifts due to temperature changes e. g. caused by solar radiation or internal or external heat sources, hysteresis effects due to cable forces and their changing forces, and the part weight can be relevant influences.

According to many approaches the mentioned errors are only analyzed statically, although they also comprise dynamic factors which are dependent on the movement of the axes, in particular dependent on the position, speed, acceleration and jerk when moving the axis. With the speed-dependent calibration, this fact is taken into account in a rather simple and inflexible way. While the static errors can be numerically reduced by the use of position calibration matrices, things get much more complex when trying to compensate the dynamic errors.

In that context, for example, it has to be considered that accelerations of one axis of the machine (which can move further perpendicular axes and the probe head), can cause linear and angular dynamic deflections of the whole frame of the coordinate measuring machine, which in turn cause measurement uncertainties and errors. These dynamic measurement errors may be reduced by taking measurements at low accelerations, e.g. by a consequently optimized trajectory of desired movement.

Known approaches are trying to suppress deflections, vibrations and/or oscillations caused by the acceleration of the machine by a technology called input-shaping, which controls the regulating variable, e.g. the force or current of a propulsion motor, in such a way as to bypass mechanical resonances and avoid a stimulation of resonance frequencies or even actively counterforce oscillations by a accordingly manipulated variable on the output to the driving actuator control.

Also model predictive control, as a form of control in which the current control action is obtained by solving at each sampling instant a finite horizon open-loop optimal control problem, using the current state of the plant as the initial state, can be applied to CMMs. The optimisation yields an optimal control sequence and the first control in the sequence is then applied to the plant.

Exemplarily for error handling, EP 1 559 990 discloses a coordinate measuring system and method of correcting coordinates measured in a coordinate measuring machine, measuring geometrical errors while parts with various weights are mounted on the coordinate measuring machine. Compensation parameters are derived from measured results per a weight of a part and stored. A compensation parameter corresponding to a weight of a part to be measured is appropriately read out to correct measured coordinates of the part to be measured.

As a further example, EP 1 687 589 discloses a method of error compensation in a coordinate measuring machine with an articulating probe head having a surface detecting device. The surface detecting device is rotated about at least one axis of the articulating probe head during measurement. The method comprises the steps of: determining the stiffness of the whole or part of the apparatus, determining one or more factors which relate to the load applied by the articulating probe head at any particular instant and determining the measurement error at the surface sensing device caused by the load.

For handling above mentioned errors, in particular dynamic errors, usually a suitable model of the CMM is to be defined, wherein a positioning behaviour of especially the frame structure of the CMM is enabled to be described based on that model. Exemplarily, a look-up table may be defined in order to lookup a correction value correlated with an actual positioning of the frame components of the CMM. Such modelling of a CMM becomes more important along with weight (and stiffness) reduction of CMM-parts.

Weight reduction is a main topic relating to the designs of coordinate measuring machines, as if the machine components are built comprising less weight (and less stiffness) faster positioning of respective components can be achieved by causing fewer force affecting the coordinate measuring machine. On the other hand the influence of machine vibrations and torsions caused by reduced stiffness and (faster) movement of the machine components increase with weight reduction of these parts. Thus, uncertainties of derived measurement values and errors occurring from such deformations and vibrations increase accordingly.

An approach for a dynamic model which provides precise description of also oscillation errors due to less stiff machine constructions is known from EP 2 762 830.

However, by use of such modelling approach still errors occurring from movements of machine parts or from external influences remain. Again with view to build measuring machines less heavy and thus provide higher moving speeds for measuring designated work pieces, oscillations of the machine remain significantly influencing measured coordinates or positions. Moreover, a respective calibration of the CMM has to be provided in very precise and repeatable manner which needs for a reliable calibration process for the CMM and results in comparatively large effort and time consuming calibration and compensation methods.

Nowadays measuring machines in general are designed in a way that a probe at the tool centre point is moved within the working volume by the help of a large and stiff structure which acts as reproducible as possible at one X,Y,Z position.

A static mapping against interferometers and artefacts provides removing reproducible effects due to static mechanical imperfections, e.g. if guiding is not straight.

Simple models are known to take into account bending effects due to inhomogeneous temperature distribution, e.g. sensors at top and bottom of beam like structures (X-beam) allow the calculation of a corresponding bending curve.

Probe qualification (calibration) at least at one position within the workspace minimises the effects of deformation due to forces and inertia. This kind of qualification can be extended to other locations within the workspace. The effects can be taken into account by a kind modelling as known from EP 2 762 830.

However, to be able to put the machine in "shop floor" conditions or later "in-line" or later "in-process" the machine has to be more robust to withstand those harsh environments. One strategy might be to replace air bearings by ball or cylinder bearings.

This affects the overall accuracy heavily due to hysteresis effects or reduction of reproducibility due to the other bearings. In addition and in general the overall bearing situation is over constrained which might again reduce the reproducibility.

To account for deformation effects due to acceleration, probing (by touching surfaces), and temperature distribution and to minimise hysteresis effects and in general increase reproducibility, according to the invention, additional structural and sensing elements are placed within the machine structure.

One way is to attach an additional well designed and relatively weak structure with the same abilities to provides movement in space (X,Y,Z) as the original CMM structure—e.g. the additional structure has to be able to provided unhindered moveability in Y-directions—but be as lightweight as possible (for minimising inertia effects) and be separated from any external load applied to the measuring machine (touching forces). At minimum there may be one 3-DoF (degrees of freedom, all translations) coupling to the tool centre point (where the probe head is fixed).

The rest of the structure might be uncoupled or only coupled in a loose way—no coupling of forces occurs. In that case for each moving axis an encoder (part of the sensor unit) is attached to the additional reference structure to finally calculate the position of the tool centre point in space.

In addition, the base (table) where the work piece have to be placed is influenced by the part weight and affects the tool centre point and its position in space due to deformation of the base and the structure connected to the tool centre point.

Those effects can be overcome by adding monitoring sensors placed around the base counteracting this effect—at the same time it would allow to replace the metrological base by some materials which are more cost effective or have other advantages (damping, lightweight). Metrological base means the base has to be reproducible and stable (constant) over time and/or temperature.

However, integration of additional sensor for this purpose alone is not cost effective and precise enough.

SUMMARY

It is therefore an object of some embodiments of the invention to provide a system and method enabling a more precise and cost efficient approach for compensating machine errors of coordinate measuring machines mentioned above.

Now referring to a strategy to compensate deformations and/or deflections with the help of additional structures, wherein in production and in field calibration can be minimised as well as the transport of a coordinate measuring machine (CMM) can be simplified.

According to prior art, static compensation of a typical CMM is done in a classic way with the help of an interferometer (at least one) and a levelling device (at least one) for each axis on its own. Within that procedure each degree of freedom is compared against such reference sensors (e.g. interferometer with adequate optics to measure distances, straightness, pitch, yaw, roll and/or level) along the position of the axis (statically or in a quasi-static way). A difference between CMM scale values and the values provided by the reference sensor is stored in a look up table. A calibration and compensation for the machine movement and determination of precise coordinates is given. Moreover, the relation of an orientation of the machine axes against each other (orthogonality) may be measured by means of additional artefacts or sensors.

Above procedure requires the machine to be completely assembled, installed and adjusted for calibration and, furthermore, it requires complex and time consuming procedures to finally fulfil the entire calibration procedure.

Alternatively, a more automatic way of compensation can be done with interferometers which are able to follow a target (tracking the target). Such interferometer can be positioned at different locations on the CMM (or more than one of those systems can be used) and reference values are determined according to different relative positions between the tool centre point (TCP) and the interferometer.

However, in general, the system (CMM) has to be completely assembled and finally after some calibration measurements with one of the above described methods a look up table is generated which is then used to compensate mechanical effects of the guiding and the orthogonality of the axes against each other.

As assembling, calibrating and then shipping a coordinate measuring machine as one part is quite complex, needs comparatively large efforts and is quite prone to error (e.g. due to environmental influences during shipping), it is an objective of some embodiments of the present invention to provide a more simple process of calibrations, compensations and in particular transportations for a coordinate measuring machine.

That object is achieved by realising the features of the independent claims. Features which further develop the invention in an alternative or advantageous manner are described in the dependent patent claims.

One aspect of some embodiments of the present invention relate to the idea to use a modular reference module which comprises a reference element and a sensing unit for determining its relative position to the reference element. The reference element and the sensing unit are jointly arranged so that defined movability of the sensing unit relative to the reference element (particularly along the elongated reference element) is provided.

In general, as the sensing head and counterpart (reference element) of the reference module have to be precisely calibrated and, hence, each degree of freedom of this sensing system has to be compensated with small increment along the positioning direction, this would lead to an in field compensation of the final assembly with comparatively high time consumption and complexity.

The idea of some embodiments the present invention is to provide a fully or partially calibrated and compensated reference module, wherein the calibration is enabled without the need for the fully assemble of a CMM but can be realised by direct calibration of the sensing unit relative to the reference element in an un-mounted state.

It means for the production a separate facility is provided to do the compensation of the reference module separately without the need of attachment to the CMM.

The final calibration and compensation values (e.g. a corresponding look up table) can be stored in a database or directly with the reference component (sensor unit (sensing unit) or reference element). Such values provide a defined position of the sensor unit relative to the reference element due to a defined measurement of a scaling at the reference element by the sensor.

The structural elements (reference element and sensor unit) together with the look up table can then be later installed at one CMM for a specific axis. By doing so, a precise and reliable determine of coordinates regarding the respective axis is provided. This axis then is fully compensated for the targeted degree of freedom—no additional compensation is required.

In particular, the sensing head and/or counterpart is identified (by the CMM) by some measures of e.g. a barcode, or of a RFID-chips etc.

The calibration of the reference module provides (automated) calibration of up to six degrees of freedom (6 DoF), in particular at one time synchronously. With other words, the calibration is provided so that the reference module may enable to acquire in a synchronous way up to 6 DoF together with the sensor values from the sensing head.

In a later step, possibly remaining errors e.g. due to an orientation of the reference element can be compensated in a classic way known from prior art as mentioned above (e.g. by using a levelling device etc.).

Moreover, in a further step a calibration of orthogonality (skewness) of the axes against each other can be performed According to an embodiment of the invention, at least one of the main machine axes (X-, Y- and Z-axis) can be equipped with respective reference modules, in particular wherein each of which measures and/or monitors with up to 6 DoF for the respective axis. No additional axis calibration or reduced calibration effort is required then. Skewness (orthogonality) may still have to be calibrated separately.

An axis and degree of freedom equipped with a reference module does not have to be assembled fully at the production facility. Final assembly might be done at customer site.

By attaching the reference module, at least the respective axis directly is calibrated regarding the specified degrees of freedom.

The reference module and the CMM may comprise mutually matching components for structural combination. Such matching components (on side of the CMM) are preferably attached at defined positions which provide comparatively low sensitivity on possibly occurring vibrations or oscillation of the CMM, particularly also taking into account temperature drifts, hysteresis effects and local deflections of the CMM and/or the reference module. Thus, the reference element can be foreseen to be fixed at specific points (Bessel points) of the CMM. In particular, such positions are determined by use of a finite element analysis and/or using a dynamic model for describing the oscillation behaviour of the coordinate measuring machine and/or the reference module.

A further aspect of fixing the reference module to the CMM relates to the fixation of the reference element (counterpart) in a repeatable way, wherein the respective look up tables do not have to be changed. For that, the attaching components may be designed in rigid manner and may be rigidly fixed both to the CMM and to the components of the reference module. Moreover, a respective attaching mechanism may be provided which enables a high-precision fitting for minimising or avoiding a possible lash (free play) between the combined components. Moreover, internal forces generated by fixing the reference module on the CMM should not influence the respective look up tables.

However, dislocations with lowest frequency behaviour (along the position of the axis) can be accepted (e.g. due to temperature variations, transportation and its effects—large temperature/humidity changes etc.). Thus, the compensation has to be done in the field at small amount of points. An appropriate fixation can be achieved by an isostatic fixation of the counterpart in a way that no external forces are introduced by mounting the reference structure.

Moreover, the reading head (sensor unit) and the counterpart (reference element) are designed to be mountable in such adjusted way that a look-up table for a first reference module can further be used when replacing the first module by a second such module or a part of it. With other words, the modular fixation is provided so that respective reference modules are provided within defined limits of tolerance not or only negligibly influencing the accuracy of the measuring system.

A particular advantage of the modular reference system of above is the simplification of requirements for shipping and transportation of the whole CMM system as the system does not have to be fully assembled. Further, also the repeatable calibration process for the whole CMM is simplified due to the possibility to replace or recalibrate only the reference module but not the entire system. For instance, after a machine crash only the reference module or a part of it has to be replaced, wherein a required accuracy can still be guaranteed.

Some embodiments of the invention thus relates to a method for providing precise coordinate measurement with a coordinate measuring machine. The method comprises initially calibrating a stand-alone reference module having a reference element with a defined scaling. The calibration is done by measuring physical properties of the reference element (and detection properties of a possibly arranged sensor unit) with reference to respective absolute standards and deriving calibration data for the reference module based on the measurement, the calibration data providing information about a particular positioning of a sensor unit relative to the reference element depending on a respectively detected portion of the scaling.

In one embodiment of the method, the sensor unit is part of the reference module and is adapted for detecting the scaling of the reference element, in particular wherein also properties of the sensor are initially detected.

However, according to an alternative embodiment, the sensor unit can be represented by a sensor being (integral) part of the CMM itself, e.g. a sensor (e.g. linear encoder) being typically used for reading out linear scales of the CMM. Those mentioned variations of used sensors are also applicable to approaches of reference modules described in more detail below.

The calibration data can be provided for both the reference element and the sensor unit or can be individually provided for only one of those components. The sensor unit may be designed to be used with a specific reference element, wherein the senor unit is calibrated in accordance with the intension to be used with the specific reference element.

With other words, the reference module is provided in a pre-calibrated state for being used with a coordinate measuring machine. The reference module furthermore enables to determine measuring coordinates on its own, i.e. the respective coordinates can be derived using only the standalone reference module. Up to 6-DOF information of the reference module can be used to calculate a position of the tool centre point relative to a up to 6-DOF motion.

Mentioned calibration standards can be designed as a target shape for the reference element, i.e. providing exact target dimensions, or may be represented by a high-precise and calibrated sensor unit which enables to reliably measure e.g. the reference element to be calibrated.

Subsequently to calibration, the reference module is attached to the coordinate measuring machine and the calibration data is provided to a controlling and processing unit of the coordinate measuring machine in such a way that the reference module provides determination of an orientation value representing an orientation of the sensor unit relative to the reference element.

The reference module preferably is attached in addition to a standard encoding unit of the coordinate measuring machine which unit provides the measurement of coordinates which the coordinate measuring machine is designed for. Such encoding units are initially integrated with the CMM for providing desired measuring properties.

In particular, the orientation value determinable by means of the sensor unit represents the orientation of the sensor unit relative to the reference element in at least two degrees of freedom.

According to a further embodiment of the invention, the reference module provides determination of movement information which relates to machine movement relative (e.g. orthogonal) to regular movement the coordinate measuring machine is designed for, in particular wherein regular machine movement is a movement of a machine component along a linear machine axis. By that possible roll or tilt errors can be derived and respective compensations can be applied.

In another embodiment, the reference module is attached to the CMM so that it provides determination of position and/or orientation values with reference to at least one axis of the coordinate measuring machine.

Moreover, information about a structural deformation of at least a part of the coordinate measuring machine can be provided by the reference module and a respective mounting of it.

According to a specific embodiment, portions of the scaling are detected at particular points along the reference element with the sensor unit and the detected portions of the scaling are assigned to respective relative positions of the sensor unit relative to the reference element and the calibration data for the reference module is derived based on the detection. Thus, a direct mutual calibration of the sensor unit and the reference element can be provided and highly precise position determination can be performed.

As a big advantage of this aspect of the present invention, a determination of machine coordinates by means of a machine scale can be replaced or enhanced by the determination of coordinates derived from the position (e.g. by additionally deriving tilt and/or roll of one axis) and/or orientation values by means of the reference module and the calibration data.

This means, by attaching a reference module with matching sensor unit and reference element to a CMM enables to directly determine precise coordinate values based on a measurement with the reference module. A scale and respective measuring equipment integrated in the CMM system no longer is necessary to acquire reliable coordinates. Also a combination is possible, wherein a reference module is only provided for a first axis, or for a first axis and a second axis.

Concerning the design of the reference module, the reference element can be designed as an elongated structure (reference beam), wherein the scaling provides information at least about a position along the structure and/or a displacement relative to the structure and/or about an orientation relative to the structure, in particular about a relative position with three translational degrees of freedom (and also rotational degrees of freedom, e.g. if combined with two translational values displaced along one axis). Of course, alternative designs for the reference element are available (compare FIGS. 2a,2b) which provide determination of respective positional information. Such designs are preferably suitable for CMM structures having linear driving elements. Such or similar solutions are suitable for rotational CMMs (e.g. Scara).

In particular, the reference element is attached so that the reference element extends at least substantially parallel to one of linear main machine axis (X,Y,Z). Here, the CMM also is provided as a linear measuring machine like a portal CMM or the like. Particularly, the portal is designed to be moveable along a Y-direction relative to the base and the reference element is attached extending in the Y-direction (e.g. on the base). The sensor unit then may be attached to one of the portal legs so that a positional measurement with reference to the reference element can be performed. Thus, dislocation, deformation and/or bending between the base and the portal leg or any other structural component or globally over a number of structural components can be determined.

With other words, the reference element is attached to a first and the sensor unit is attached to a second structural component of the coordinate measuring machine, in particular wherein the reference element and the sensor unit are attached to the coordinate measuring machine in a basically unloaded manner, i.e. fixed in a way that avoids any stress inside the part.

According to an alternative design, the reference element is designed for providing positional information of rotational machine movements. The reference element may be of circular shape and attached encircling a rotational axis of a respective measuring machine. The sensor unit may accordingly be attached to a neighbouring machine component, e.g. by connecting reference modules together, so that positional measurement to the circular reference element can be performed.

Referring to the design of the scaling of the reference element, the scaling of the reference element can comprise a structure and/or pattern which—on detection by the sensor unit—provides information about an absolute orientation of the sensor unit relative to the reference element, in particular wherein the information provides a relative orientation with three rotational degrees of freedom. Thus, a state determination of the sensor unit relative to the reference element is provided with up to six degrees of freedom.

For providing precise measurement of coordinates and/or errors precise knowledge about an actual state of the reference module may be available, in particular of the reference element. For that, the reference module (reference element and/or sensor unit) is made from high environmental-stable material, i.e. the components remain within defined tolerance limits at occurrence of e.g. temperature or humidity changes etc. Moreover, the reference module can be fixed in uncoupled manner (concerning vibration of the machine). Alternatively or additionally, a current state of the reference module can be derived based on modelling the module with a dynamic model. Here, the material does not require to provide best stability but provides a physical behaviour which can be described by a respective model with high precision.

So, a digital dynamic model can be provided which describes deformations and/or vibrations of the reference element and/or the senor unit, in particular of the entire reference module, due to machine movements and/or external influences (e.g. thermal influences or thermal changes). Thus, the dynamic model provides a calculation of a current state of the reference module or element at any instance in time, in particular during a measurement of a work piece.

Based on an actual state of the reference element, in particular of the reference module, the coordinates measured by the CMM can be derived (and compensated), wherein the actual state is derived by a calculation based on the dynamic model. Possible error behaviour of the reference module can be described by mean of the dynamic model, wherein knowledge about such an error enables to compensate respective coordinate measurements correspondingly.

According to a specific embodiment of the invention, a look-up table is provided which comprises position and/or orientation values for a position and/or orientation of the senor unit relative to the reference element, wherein the position and/or orientation values are assigned to particular detection signals representing respective detections of the portions of the scaling.

Moreover, additionally or alternatively, a particular look-up table is provided for the sensor unit and/or reference element, the look-up table comprising a relationship between measuring signals (for the sensor) and particular assigned distance values and/or comprises position information for the reference element depending on the physical property of that element, in particular of the scaling properties.

Therefore, by providing a corresponding look-up table with a respective reference component, a (re- or initial) calibration of a CMM system is provided in a comparative simple form.

The look-up table can be generated based on the calibration data, i.e. from a measurement of the physical properties of the reference element and/or the detection properties of the sensor unit a defined relationship between particular features of the reference module and relative position and/or orientation information is determined and stored in a respective database. The look-up table may be provided directly with the CMM, the reference module (or one component thereof) or externally e.g. by a data-cloud or web-server.

Concerning the modular design of the reference module and the improved flexibility of attaching the module components, a further aspect of some embodiments of the invention relate to the approach of individually replacing the reference element or the senor unit while keeping a part of the calibration data with the controlling and processing unit (of a CMM) and conducing a coordinate measurement with the replacing reference element or the replacing senor unit and the remained part of the calibration data and an added part relating to the replaced component. As already mentioned, accordingly, only one of the components of the reference module may be changed on its own, wherein given requirements for measuring of coordinates are still provided (aside some low frequency drift effects for performing the measurements). As each modular component is precisely calibrated on its own and with reference to a type of matching counterpart, this can be done with maintaining a given set of calibration parameters for a remaining component (which is not replaced) or even for both modular components.

Some embodiments of the invention also relate to a stand-alone reference module being adapted to provide calibration or compensation for precise measurement with a coordinate measuring machine. The reference module comprises a reference element with a defined scaling, in particular a sensor unitdesigned and arranged for detecting at least a part of the scaling, and a set of calibration data.

According to some embodiments of the invention, the reference module is designed to be at least partly calibratable in a standalone manner so that a part of the scaling detectable by a sensor unit provides information about an absolute position of the sensor unit relative to the reference element, the information representing the calibration data. Moreover, the reference module is designed to be attached to the coordinate measuring machine in a basically unloaded manner, wherein the reference element is to be attached to a first (and the sensor unit is to be attached to a second) structural component of the coordinate measuring machine. In an attached state, the reference module provides determination of an orientation value representing an orientation of the sensor unit relative to the reference element.

The stand-alone reference module may be attached in addition to a standard encoding unit of the coordinate measuring machine which unit provides the measurement of coordinates which the coordinate measuring machine is designed for.

In particular, the orientation value determinable by means of the sensor unit represents the orientation of the sensor unit relative to the reference element in at least two degrees of freedom.

Furthermore, in particular, the reference module provides determination of movement information which relates to relative machine movement orthogonal to regular movement the coordinate measuring machine is designed for, in particular wherein regular machine movement is a movement of a machine component along a linear machine axis.

In one embodiment the sensor unit can be part of the reference module and is arranged and designed for detecting the scaling, wherein the sensor unit would have to be attached to a second structural component.

In particular, the reference module comprises an attaching unit matching with a corresponding attaching unit at the coordinate measuring machine, wherein the attaching unit provides modular mounting and dismounting of the reference element and/or the sensor unit with defined position and/or orientation relative to the coordinate measuring machine.

Furthermore, some embodiments of the invention also relate to a coordinate measuring machine comprising such modular reference module. The CMM comprises a machine structure with a plurality of structural components wherein the structural components comprise at least a base and a probe head and wherein the machine structure provides linking the probe head to the base. The CMM particularly also comprises at least one drive mechanism for providing movability of the probe head relative to the base.

As mentioned, the coordinate measuring machine comprises a reference module as described above, the reference module being provided in a pre-calibrated state, wherein the reference element is attached to a first and the sensor unit is attached to a second structural component of the coordinate measuring machine, a controlling and processing unit of the coordinate measuring machine comprises the set of calibration data according to the pre-calibrated state and the reference module provides determination of a position and/or orientation value between the sensor unit and the reference element.

In one embodiment the CMM comprises at least one drive mechanism for providing movability of the probe head relative to the base.

In particular, the reference element and/or the sensor unit are attached to the coordinate measuring machine in a basically unloaded manner.

According to a preferred embodiment, the controlling and processing unit is configured to determine coordinates for a measurement only based on measuring data provided by the sensor unit of the stand-alone reference module.

Another aspect of some embodiments of the invention pertain to a strategy to compensate deformations and/or deflections resulting from temperature changes with the help of mentioned additional structures.

In coordinate measuring machines, temperature compensation is generally done with the help of distributed temperature sensors placed at specific positions around the CMM itself. The delta and absolute values are used to account for homogeneous effects (linear volumetric shrinkage/expansion) and to account for inhomogeneous effects due to environment and internal heat sources.

Temperature compensation can be subdivided into scale compensation (for the three Cartesian directions), compensation of homogenous structural effects and compensation of inhomogeneous structural effects.

If e. g. a scale such as a linear encoder is mounted on the machine independently so as to allow thermal expansion independent from the supporting structure and if local temperature sensors measure the absolute temperature and changes within the measurements, with the knowledge of the CTE value of the scale itself the shrinkage or expansion along the scale itself can be compensated. To determine the volumetric structural shrinkage or expansion, the absolute and relative changes are taken into account together with the CTE of the structural elements. The temperature measurements are interpreted as homogeneous fields, i.e. "bending effects" are not considered.

For the inhomogeneous temperature compensation and their structural impact local difference in temperature and local difference change over time are taken into account and translated into a "bending" by considering length changes relative to thermal expansions and CTE values of the materials. To be able to put the machine in harsh environments—stepwise starting with "shop-floor" conditions and later extend to "inline" and "in-process" conditions, these prior art compensation strategies might be not enough and limit the overall performance.

It is therefore an object of some embodiments of the present invention to provide an improved coordinate measuring machine CMM and method, wherein errors caused by temperature variations can be compensated for in an improved manner.

In particular, displacement errors in each linear drive mechanism (in the X,Y,Z directions) of the CMM and/or deflections and deformations (e. g. bending) in the frame structure of the CMM should be recognized and compensated for precisely.

It is a particular object to provide such a method, wherein an axis bending due to an inhomogeneous temperature distribution is addressable.

Temperature induced expansion or shrinkage of the scale can be treated similarly to current compensation strategies. The mechanical reference element is based on "metrological" materials and thermally separated from the rest of the structure. The compensation of those effects might be applicable and lead to even better overall compensation however the scale has to be rigidly connected to the reference element. This can also be combined with a loose fixation of the scales, wherein a temperature of the scales is measured and compensated accordingly.

Alternatively, inside the reference element an additional beam might be placed that is perfectly protected (i.e. insulated) from the environment, where one end is fixed to a first end of the reference element and the other end comprises a sensor for measuring low frequency effects (independent of dynamics) of this setup. For instance, this sensor might measure distance changes in at least one degree of freedom (in axial directions) of the reference element. The sensor can be based on capacitive or inductive principle or eddy current, or can be a PSD or other optical based lateral displacement sensor.

Alternatively or additionally, the physical behaviour of the reference element and/or the sensor unit due to external (environmental) influences may be described and calculated based on a model representing an actual state of the reference module. In particular, an expansion, shrinkage or bending of the reference element can be determined based on such model, e.g. by additional use of current temperature values and knowledge about the mounting or fixation of the reference element and/or heating sources (e.g. motor power dissipation or sensor unit power dissipation). The principle of modelling at least one part of the reference module is described already above and in more detail below.

Inhomogeneous temperature distribution can lead to a bending of frame elements. One solution to address this problem comprises the use of a reference system comprising mechanical reference elements and displacement sensors for continuously measuring at least one degree of freedom. As the bending of the structural elements is completely decoupled from the reference system, this remains unaffected by this bending and therefore repeatable. A bending of the reference structure itself can occur due to inhomogeneous temperature distribution which also could be compensated exactly. Effects correlated with that typically are distinctly smaller than corresponding effects at the frames (by at least factor of 2).

In order to uncouple the bending from a reference element, the ends of the reference element are fixed in a way which allows thermal expansion and volumetric expansion without changing the straightness of the beam. For instance, these requirements are fulfilled by means of an "isostatic" fixation of the reference element against the axis, such as a well defined three point fixation, or by means of flexure based connections at the beginning and end of the beam itself.

Rigid movements of the reference element relative to the machine axes are allowed between the measurements; it has to remain stable during at least one measurement cycle, however.

If one assumes that the machine can be seen as a reproducible machine, the displacement sensor and its sub-elements are allowed to drift between the measurements cycles but not within one measurement cycle. Scanning the axis without any additional load in a static way, later allows a compensation of the drifts (offsets) by applying an advanced filtering.

To achieve robustness within one measurement cycle, the sensing head and counterpart additionally can be decoupled from the environment and/or any heat source as good as possible. This can be achieved by thermal insulated but stiff connection to original structural elements with the help of ceramic based coupling elements (cubes, rectangular bodies, spheres) and/or small contact areas or with contact areas having a high thermal resistance (ceramic, glass). In addition, large thermal conductivities/thermal insulations and/or low CTE materials allows even better uncoupling between the axes.

One aspect of some embodiments the invention relate to a method of compensating errors in a coordinate measuring machine which is adapted for determination of at least one spatial coordinate of a measurement point on an object to be measured, the coordinate measuring machine comprising
- a machine structure with a plurality of structural components wherein the structural components comprise at least a base and a probe head for approaching the measurement point and wherein the machine structure provides linking the probe head to the base,
- a reference module comprising a reference element and a sensor unit assigned to the reference element, wherein the reference element is attached to a first structural component with a known relative position to the first structural component and the sensor unit is attached to a second structural component with a known relative position to the second structural component, and
- a controlling and processing unit adapted for execution of a modelling functionality.

According to this aspect of the invention, the method comprises
- deriving by means of the sensor unit a distance and/or angle between the reference element and the second structural component, wherein a derived distance and/or angle indicates a displacement or a deformation of the first structural component and/or the second structural component,
- defining a dynamic model with a first set of state variables, the state variables being related to a set of physical properties of the reference module and representing an actual state of the reference module,
- deriving the actual state of the reference module by a calculation based on the dynamic model, and
- deducing compensation parameters based at least on the actual state, in particular also based on the distance from the reference element to the second structural component.

In one embodiment of this method, the machine structure comprises at least one drive mechanism moveably linking at least two of the structural components for provision of movability of the probe head relative to the base.

In another embodiment, the state variables are related to a set of physical properties of the reference element and represent an actual state of the reference element, and the actual state of the reference element is derived by a calculation based on the dynamic model.

In another embodiment, the method comprises determining a position of the second structural component relative to the first structural component, particularly wherein the method comprises determining a position of the second structural component relative to the reference element.

In yet another embodiment, the method further comprises
- monitoring at least one of the state variables of the first set of state variables and, based thereon, determining a change of at least one of the state variables,
- setting a second set of state variables with updated state variables as to the determined change of the at least one of the state variables and
- updating the dynamic model using the second set of state variables as the first set of state variables, in particular wherein the actual state of at least the part of the coordinate measuring machine is calculated based on at least the second set of state variables.

In a further embodiment, the method comprises deriving an actual state of the machine structure or a part thereof by a calculation based on the dynamic model.

Optionally, the method comprises issuing a warning signal to a user and/or a stopping command to the coordinate measuring machine if the derived distance and/or angle exceeds a predefined threshold value.

Another aspect of some embodiments of the invention relates to a coordinate measuring machine for determination of at least one spatial coordinate of a measurement point on an object to be measured, comprising
- a machine structure with a plurality of structural components wherein the structural components comprise at least a base and a probe head for approaching the measurement point and wherein the machine structure provides linking the probe head to the base,
- a reference module comprising a reference element and a sensor unit assigned to the reference element, wherein the reference element is attached to a first structural component with a known relative position to the first structural component and the sensor unit is attached to a second structural component with a known relative position to the second structural component, and
- a controlling and processing unit adapted for execution of a modelling functionality.

According to this aspect of the invention, the reference element and the sensor unit are designed and arranged in such a way, that by means of the sensor unit a distance and/or angle between the reference element and the second structural component is derivable, wherein a derived distance and/or angle indicates a displacement or a deformation of the first structural component and/or the second structural component. On execution of the modelling functionality a dynamic model with a first set of state variables is defined based on the measured distance, the state variables being related to a set of physical properties of the reference module and representing an actual state of the reference module, the first set of state variables is provided to the controlling and processing unit, and the actual state of the reference module is derived by a calculation based on the dynamic model.

In one embodiment of the coordinate measuring machine, the state variables are related to a set of physical properties of the reference element and represent an actual state of the reference element, and the actual state of the reference element is derived by a calculation based on the dynamic model.

In another embodiment of the coordinate measuring machine, the machine structure comprises at least one drive mechanism moveably linking at least two of the structural components for provision of movability of the probe head relative to the base.

In one embodiment, the drive mechanism is a linear drive mechanism moveably linking the base and another structural component for provision of movability of the probe head relative to the base in a first direction, and the reference element extends in the first direction.

In one embodiment of this coordinate measuring machine, the reference element has a first end and a second end, wherein at least one of those ends is fastened to the first structural component, particularly the base, by fixation means allowing an expansion of the first reference element in a first direction decoupled from a deformation and/or an oscillation of the first structural component.

In one embodiment of this coordinate measuring machine, the fixation means are loose fixation means comprising an isostatic three-point fixation, flexure based connections, a fixed-loose bearing and/or a four-point V-groove connection.

In one embodiment, the fixation means comprise thermally isolating material, in particular ceramics or glass, for thermally isolating the reference element from the first structural component. The same holds true for the sensor unit.

In another embodiment of the coordinate measuring machine, the reference module is adapted to determine a position of the second structural component relative to the first structural component. In particular, the reference element comprises a machine-readable scale, and the sensor unit is adapted to deduce a position of the first structural component relative to the first mechanical reference element based on the scale.

In yet another embodiment of the coordinate measuring machine, on execution of the modelling functionality
- at least one of the state variables of the first set of state variables is monitored and, based thereon, a change of at least one of the state variables is determined,
- a second set of state variables with updated state variables as to the determined change of the at least one of the state variables is set, and
- the dynamic model is updated using the second set of state variables as the first set of state variables, in particular wherein the actual state of the reference module is calculated based on at least the second set of state variables.

In yet another embodiment, the reference element and the sensor unit are directly mechanically coupled in at least five degrees of freedom.

In a further embodiment, the reference element comprises an internal sensor unit for determination of dimensional changes, particularly comprising temperature-induced expansion, contraction or bending, of the reference element.

Another aspect of some embodiments the invention relate to an improved fixation of a reference element to a CMM. A coordinate measuring machine according to this aspect for determination of at least one spatial coordinate of a measurement point on an object to be measured comprises a machine structure with a plurality of structural components wherein the structural components comprise at least a base and a probe head for approaching the measurement point and wherein the machine structure provides linking the probe head to the base, and a reference module comprising a mechanical reference element extending in the first direction, and at least one sensor unit assigned to the reference element, the reference element and the sensor unit being designed and arranged in such a way, that a distance and/or angle between the reference element and the sensor unit is derivable. According to this aspect of the invention, the reference element is fastened to a first structural component by fixation means allowing an expansion of the reference element in the first direction decoupled from a deformation and/or an oscillation of the first structural component, wherein a distance and/or angle derivable by the sensor unit indicates a displacement or a deformation of the first structural component.

It is to be understood in context of the invention that the a distance and/or an angle derived by the sensor unit not only indicates a displacement or a deformation of the first structural component but also may represent a structural error occurring between a respective structural component and a component-related connecting point for a part of the reference module or part of the second structural element, e.g. at or around a point of connection for the sensor unit at the second structural component.

In one embodiment of the invention the CMM comprises at least one (linear) drive mechanism moveably linking the base and another structural component for provision of movability of the probe head relative to the base in a first direction.

In one embodiment of the CMM, the fixation means comprise flexure based connections.

In another embodiment of the CMM, the fixation means are adapted as an isostatic three-point fixation.

In another embodiment of the CMM, the fixation means are adapted as two V-groove connections, particularly one V-groove connection at each end.

In a further embodiment, the fixation means comprise thermally isolating material, in particular ceramics or glass, for thermally isolating the reference element.

In one embodiment of the CMM, the sensor unit is adapted and arranged to detect a position of the first structural component relative to the reference element in at least three degrees of freedom, particularly in six degrees of freedom.

In another embodiment of the CMM, a reference element and a sensor unit are mechanically coupled in five degrees of freedom, particularly directly mechanically coupled.

In yet another embodiment, the deviation of the actual dimension from the nominal dimension comprises temperature induced structural deflections and/or deformations, an expansion and/or shrinkage of the reference element in the first direction, and/or a bending of the reference element.

In a further embodiment of the CMM, the reference module is adapted to issue a warning signal to a user and/or a stopping command to the coordinate measuring machine if the distance exceeds a predefined threshold value.

Above approaches relate to reference modules mounted or mountable to CMMs mostly in an exoskeleton way (i.e. exposed). However, alternatively or additionally, the reference element and/or the sensor unit may be provided in an inside skeleton way, and/or may be provided integrated in one or more respective structural component(s), e.g. into one or both of the portal legs or into the connecting crossbeam (bridge). In particular, the reference element may be an integrated (but still modularly exchangeable) part of the crossbeam and the sensor being arranged moveable relative thereto (externally or inside the beam).

Relating to rotational CMMs, like a Scara-Type CMM, the reference element may be provided inside of a structural component (e.g. inside of an arm of the Scara machine), wherein a first end of the reference element can be linked to an axis or shaft around which the arm is rotatable and the sensor unit can be arranged near or at the second end of the reference element mounted to the inner housing of the arm or at the axis or shaft of the next arm segment. By that, as the reference element is mechanically decoupled from the arm, possible deformations of the arm can be detected.

BRIEF DESCRIPTION OF THE DRAWINGS

The methods and the devices according to the invention are described or explained in more detail below, purely by way of example, with reference to working examples shown schematically in the drawings. Specifically.

FIGS. 7a-d show a second exemplary embodiment of the fixation of the reference element.

DETAILED DESCRIPTION

Figure 1:
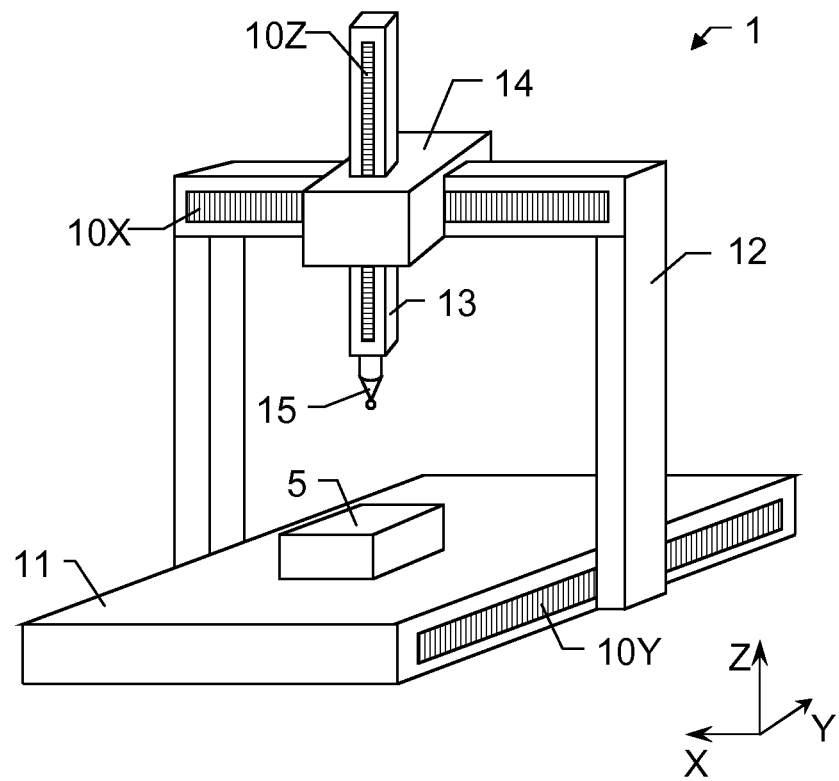
FIG. 1 shows a first exemplary embodiment of a coordinate measuring machine according to the invention.

In FIG. 1 an exemplary embodiment of a portal coordinate measuring machine 1 (CMM) is depicted, the coordinate measuring machine 1 comprises a base 11 and a frame structure for linking a probe head 15 to the base 11, the frame structure comprising several frame components 12,13,14 being movable with respect to another. The first frame component 12 is a portal having two portal legs, which are connected by a bridging portion at their upper ends. Driven by a drive mechanism (not shown), the frame component 12 is capable to move along the longitudinal sides of the base 11. This direction corresponds to a first direction X. The movement of the frame component 12 particularly is performed by a gear rack attached to the base 11, which is meshing with a pinion on the frame component 12. Generally speaking, the CMM 1 comprises structural elements 11-15, i.e. the frame structure 12-14, the base 11 and the probe head 15.

A carriage 14 is movably arranged on the bridging portion of the frame component 12. The movement of the carriage 14 (which is to bee seen as a further frame component) may also be achieved by a rack and pinion. A vertical rod 13 (sleeve, Z-ram), building a further frame component, is movably incorporated into the carriage 14. At the bottom portion of the vertical rod 13 a probe head 15 is provided.

The probe head 15 is movable to any desired point in a measuring volume (work zone) of the coordinate measuring machine 1 in the directions X, Y and Z. The measuring volume is defined by the base 11 and the frame components 12,13 and in particular by the range of movability of the carriage 14. The three space directions X, Y and Z are preferably orthogonal to one another, although this is not necessary for the present invention. It should be noted that a drive mechanism and a controller for driving the frame components and, thus, for driving the probe head 15 are not shown.

An object 5 to be measured is positioned in the space of the measuring volume on the base 11.

The probe head 15, on which a stylus is arranged exemplarily, is fastened on the lower free end of the rod 13. The stylus is used in a manner known per se for touching the object 5 to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head.

More generally, the probe head 15 may be designed for arranging a contact probe, e.g. a scanning or touch trigger probe, or a non-contact probe, particularly an optical, capacitance or inductance probe, an articulated probe or a triangulation sensor.

Two of the most common types of bearings between the movable members and the guides are air bearings or ball bearings (e.g. linear circulating plus rails). The air bearings give the advantage that there is no friction in the movement (which may introduce different kind of errors like angle errors or hysteresis). The disadvantage of air bearings is that the stiffness is lower than in ball bearings, so that particularly dynamic errors may occur. In ball bearing types, the stiffness in the bearing system is typically higher and they are more robust against typically dirty and dusty shopfloor conditions, but there is friction and the friction forces may introduce errors. However, the invention may be applied for both types of bearings.

Summed up, the coordinate measuring machine 1 is built for determination of three space coordinates of a measurement point on an object 5 to be measured and, therefore, comprises three linear drive mechanisms for provision of movability of the probe head 15 relative to the base 11 in the first, second and third direction (X, Y and Z direction) and particularly machine components providing additional rotatory degrees of freedom (e.g. articulated probe).

Each linear drive mechanism has a linear guide, one in the first, one in the second and one in the third direction (X, Y and Z direction), respectively. In a simple embodiment, the linear guide of the Y-direction drive mechanism is formed by two edge-building surfaces of the base 11, the linear guide of the X-direction drive mechanism is formed by two or three surfaces of the bridge and the linear guide of the Z-direction drive mechanism is formed by a cubical hole in the X-carriage member.

Furthermore, each linear drive mechanism comprises a movable member being supported for movement along the guide by bearings. In particular, the movable member of the Y-direction drive mechanism is embodied as Y-carriage having mutually facing surfaces with respect to the above mentioned two or three guiding surfaces of the base 11. The movable member of the X-direction drive mechanism is embodied as X-carriage 14 having mutually facing surfaces with respect to the above mentioned two or three guiding surfaces of the bridge. And, the movable member of the Z-direction drive mechanism is formed by Z-column 13 (sleeve) having mutually facing surfaces with respect to the inner surfaces of the cubical hole in the X-carriage.

Moreover, each linear drive mechanism comprises a linear measuring instrument for determination of a first, a second or a third drive position, respectively, of each movable member in the first, the second or the third direction (X, Y and Z direction), respectively.

In this exemplary embodiment of FIG. 1, the portal legs each have a movable Y-carriage which allows movement of the first frame component 12 in Y-direction.

A measuring scale 10Y being part of the Y-measuring instrument is schematically represented on the long side of the base 11, wherein the scale 10Y extends parallel to the Y-direction. The scale may be a glass measuring scale, e.g. having incremental or absolute coding, with which a drive position in the Y-direction of the Y-carriage can be determined. It is to be understood that the measuring instrument may furthermore contain suitable sensors for reading the measuring scale 10Y, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 10X is arranged parallel to the X-direction on the bridging portion of the first frame component 12. Finally, another measuring scale 10Z is also arranged parallel to the Z-direction on the Z-ram 14. By means of the measuring scales 10X,10Z as part of the linear measuring instruments, it is possible to record the present drive positions of the second frame member 14 in X-direction and of the sleeve 13 in the Z-direction metrologically in a manner which is known per se.

In the shown embodiment, the base 11 comprises or is built as a table with a granite surface plate for supporting the object 5 to be measured, on which the space coordinates of the measurement point are intended to be determined.

Not shown is a controlling and processing unit, which is designed to actuate the motor drives of the coordinate measuring machine 1 so that the probe head 15 travels to the measurement point. The controlling and processing unit comprises a processor and a memory. In particular, the controlling and processing unit is designed for determining the three space-coordinates of the measurement point on the object 5 as a function of at least the first, the second and the third drive position of the three drive mechanisms.

For manual operation, the control unit may be connected to a user console. It is also possible for the control unit to fully automatically approach and measure measurement points of the object 5 to be measured.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Thus, the invention may generally be used with all types of coordinate measuring machines, i.e. with a CMM being designed as parallel kinematics machine as well as with a CMM having linear or serial kinematics. Exemplarily, the CMM may be designed as bridge-type, L-bridge-type, horizontal-arm-type, cantilever-type or gantry-type machine or may be designed as articulated arm or Scara-type machine.

According to the invention, the CMM 1 is designed for attaching a reference module with a reference element and a sensor unit to the structural components 11-15 of the CMM 1. Such reference module enables to determine precise coordinates of points to be measured with a probe of the CMM 1. The scales 10X, 10Y and/or 10Z thus can be spared which means a full replacement of the scales by the reference module is possible.

Moreover, there would be no need (or only reduced effort) for a calibration and/or compensation of possible axes errors of the CMM itself, but such calibration or part of the calibration can be provided directly using the pre-calibrated reference module for taking coordinate measurements.

Figure 3A:
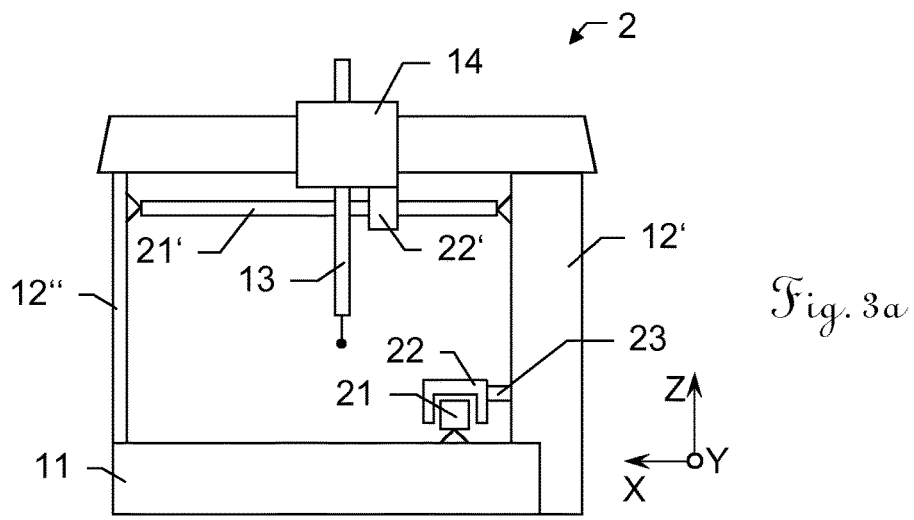
FIGS. 3a-b show further exemplary embodiment of coordinate measuring machines comprising reference modules according to the invention.
Figure 3B:
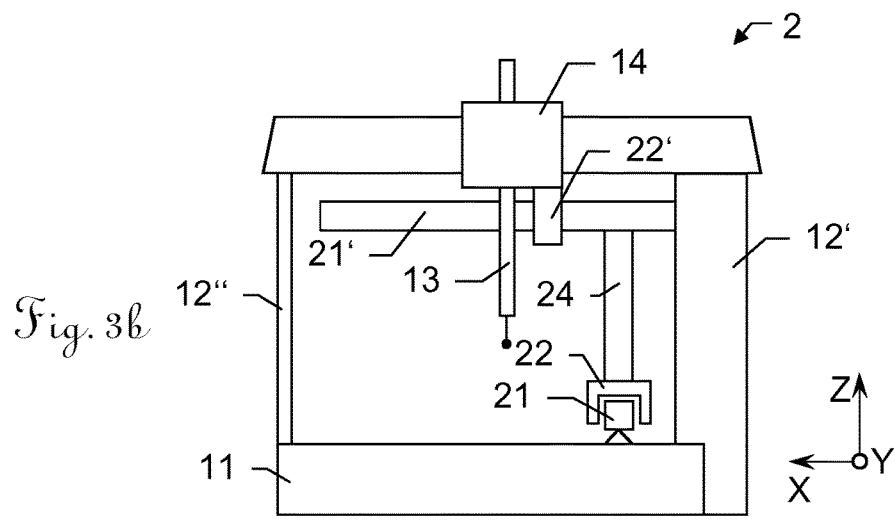

Further embodiments of the CMM 1 according to the invention are shown with FIGS. 3a and 3b.

Moreover, according to the invention, the controlling and processing unit comprises a functionality for dynamical—in particular continuously—calculating deflections of the coordinate measuring machine 1 on basis of a model which represents physical parameters of (at least a part of) the reference module. For such dynamic calculation an excitation of the reference module (or a part thereof) and/or an external impact on the reference module is monitored (e.g. by measuring physical properties or by calculation of the parameter) and system variables are updated according to the monitoring. That process of monitoring and updating the parameters is performed in defined time intervals. Thus, a change of respective system parameters (e.g. a change of temperature) and relating physical properties (i.e. the value of a physical property) is determined and/or additionally stored in a database and/or a calculation of the deflections can be performed based on that model with values from the database. By considering the history of several physical parameters, which are set for representing at least the part of the reference module by the model over time, a real dynamic calculation of occurring deformations and/or vibrations at the reference module can be done and errors caused by that deflections can be compensated for. Natural frequencies are enabled to be calculated and their influences can be corrected as well. A displacement due to thermal influences can be calculated.

Therefore, defining a model and performing monitoring of physical parameters and calculating an actual state of a reference module according to the invention allow reduction of errors due to dynamic and/or deformation behaviour of the CMM 1. Above described functionality provides an improved and precise basis for modelling reference parameters and for calculating and, particularly, correcting or compensating for deflections, i.e. for dynamically changing deflections of a CMM 1.

Figures 2A, 2B:
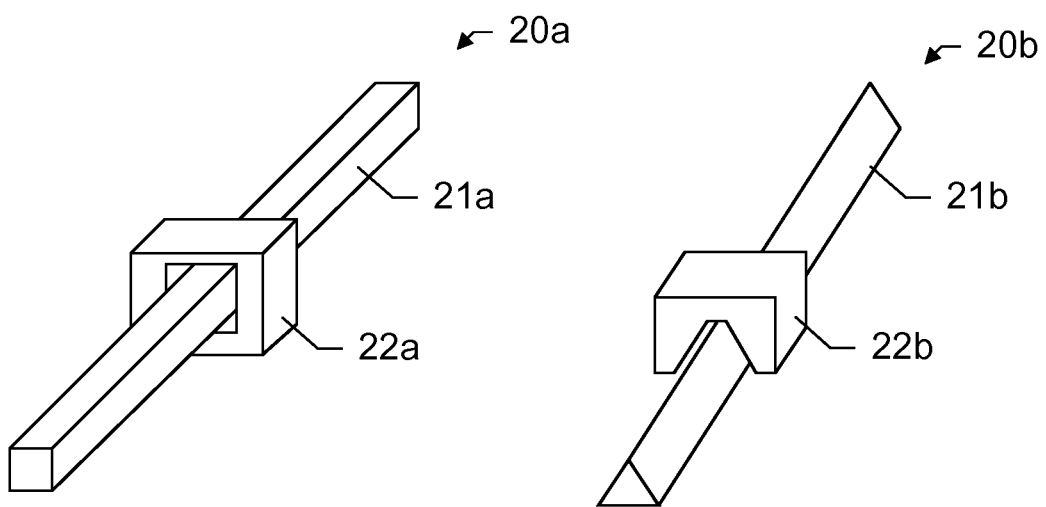
FIGS. 2a-b show embodiments of modular reference modules having a reference element and a sensor unit according to the invention.

FIG. 2a shows a first embodiment of the reference module 20a according to the invention. The reference module 20a comprises a reference element 21a which is designed with elongated shape, i.e. in form of a reference beam, and comprises a square profile. The reference module 20a also comprises a sensor unit 22a which is designed so that at least one side, particularly each side, of the reference element 21a can be sensed by the sensor unit 22a. Relative movement of the sensor unit 22a along the elongation direction of the reference element 21a and small relative movement perpendicular thereof is enabled due to the specific design of the reference module 20a.

The reference element 21a preferably comprises a scale (not shown), in particular on at least three surfaces along the entire elongation. The scale for instance may provide an incremental and/or absolute coding for providing positional determination of the sensor unit 22a relative to the reference element 21a by sensing the scaling with the sensor unit 22a. The determination of the position is enabled at least regarding the elongation direction.

According to a more specific embodiment of the invention, a relative position and orientation can be determined with respect to three (orthogonal) directions. For that, the sensor unit 22a may comprise a number of distance sensing devices providing information about a possible displacement of the sensor unit 22a relative to the reference element 21a. Such information e.g. may describe a possible bending of the reference element in case the sensing unit 22a is rigidly fixed and designed so that almost no or only negligible distortions or errors of the sensor unit 22a itself can occur.

However, the reference element 21a is designed so and built from material (e.g. Zerodur) so that there is no bending due to external, e.g. thermal, influences. Alternatively, the reference element 21a is made from material the behaviour of which due to external influences can be described and/or modelled in very reliable manner. Thus, the shape of the reference element 21a is known at each instance of measuring either by structurally avoiding any bending and deformation or by calculating the current state of the reference element 21a.

In case the reference element 21a is designed to allow a change of its structure (in particular its elongation), the reference element 21a preferably is supported by providing a linear bearing or flexure system at least for one end of the reference element 21a in order to enable unhindered extension or contraction of the length of the reference element 21a.

By doing so, i.e. by knowing about the actual state of the reference module 20a, any dislocation of the sensor unit 22a relative to the reference element 21a gives information about a structural deformation of a CMM the reference module 20a is attached to.

According to the invention, the reference module 20a is calibrated and/or compensated on its own. For that, the stand-alone reference module 20a is calibrated e.g. by use of interferometers which provides precise position and/or orientation changes of the sensor unit 22a along the reference element 21a. Accordingly, the sensor unit 22a provides respective measuring values. The measures are compared and based thereon compensation for position determination with the sensor unit 22a is derived.

Preferably, any combination of position along and/or perpendicular to the elongation, the orientation (angle) around the elongation axis or axes perpendicular thereof can be measured (e.g. up to 6-DOF).

Alternatively or additionally, the sensor unit 22a and/or the reference element 21a is calibrated independently and respective calibration data is provided for one or each of those components. Such individual calibration is done by use of respective absolute standards which provide either a target shape and/or dimension for the reference element 21a or target measuring performance for the sensor unit 22a. Standard values are compared to respective values determined for the reference module components and the calibration data is derived based on that comparison. That approach enables to individually exchange not the entire reference module 20a but also being enabled to only replace the sensor unit 22a or the reference element 21a and providing respective calibration data, wherein a precise coordinate measurement is still provided after such individual replacement.

A set of reference elements of a specific type can be adapted to a matching set of a specific type of sensor units, wherein individual calibration data is provided for each of those components or for each set of components. A respective calibration standard is provided for each set of components.

The reference module 20a can provide a fully calibrated and compensated system for determining relative positions and/or orientations of structural elements (of a coordinate measuring machine) which are designed being moveable relative to each other and to which the respective module components (reference element 21a and sensor unit 22a) are attached.

Therefore, by attaching the pre-calibrated reference module 20a to a CMM, i.e. the reference element along one of the linear axes and the sensor unit so that sensing of the reference element is provided on movement of the CMM structure along that axis, the determination of respective coordinate values by only use of the reference module 20a can be provided. There is no longer a need for a typical internal scaling or sensing system of the CMM for position determination.

Using that approach also enables to simply and fast exchange the measuring system of a CMM, e.g. in case of a machine crash etc, without the need of a full recalibration of the system. For better measuring reliability a possible skewness of the reference element and/or the sensor can be determined and considered for fine compensations.

FIG. 2b shows a second embodiment of the reference module 20b according to the invention. In contrast to the embodiment of FIG. 2a the reference element 21b comprises a triangular shape and the sensor unit 22b is correspondingly designed to sense at least two surfaces of the reference element 21b.

It is to be understood in sense of the present invention that the invention is not limited to the embodiments as shown above, but numerous modifications in particular regarding the shape of the reference element (e.g. circular, polyhedral or "I"-shaped) and the design of the sensor unit are possible which provide a relative position and/or orientation measurement.

FIGS. 3a and 3b show embodiments of coordinate measuring machines 2 according to the invention, wherein those embodiments also relate to a general approach of error compensation using reference elements 21,21' and sensor unit 22,22', to temperature-error compensation and to modular attachment of the components (i.e. reference elements 21,21' and/or sensor unit 22,22') of a reference module.

The CMM 2 comprises a base 11, a first leg 12', a supporting leg 12", a carriage 14 supported by the bridge and a Z-ram 13 being movable in Z-direction. The first leg 12' and the supporting leg 12" are part of the bridge.

The bridge is moveably in Y-direction, the carriage 14 in X-direction.

Both shown embodiments comprise two reference elements 21,21' (here: reference beams) one of which extending along the Y-axis and the other one extending along the X-axis. Respective sensor units 22,22' are arranged for both embodiments enabling detection of distances to the reference beams 21,21' and/or determining a position or positional change along the beams 21,21'. The embodiments mainly differ concerning attachment of respective reference modules.

The FIGS. 3a and 3b depict the general idea of the invention. This is to combine exoskeleton strategies with smart sensing elements 22,22' which are able to detect at least one degree of freedom of one relative moving part. The sensing element can provide determination of up to six degree of freedoms—which means a complete knowledge where the relative moving element against the other is situated in space. A coupled degree of freedom may be required to drive the exoskeleton to a desired position. It means a coupling in moving directions (of one or more axes), as shown in Y- or X-direction. The reference elements 21,21' and sensors 22,22' are mounted in a basically unloaded manner, so that no or only minimal stress is generated within the structure.

For the rest of the degrees of freedom between the exoskeleton and the original structure the coupling can be realised with the help of the smart sensing elements which detects at minimum one degree of freedom up to all six degree of freedoms.

It means at the same time beside for the moving directions additional sensing elements may be integrated which measure relative movements of parts orthogonal to the moving directions and orientations.

This again allows having not only a "global exoskeleton" coupled tightly at the tool centre point only—but also "local attached exoskeletons". E.g. "bridging" one moving directions with the other moving directions and separate within that sub-structural chain external effects (inertia, touching forces, part weight, temperature effects etc.). One of those "bridging elements" could be used standalone or combined with other "bridging elements".

FIG. 3a shows an embodiment for a standalone "bridging" variant (e.g. combined with a model for describing and calculating in-between flexibilities). FIG. 3b shows a combination of two "bridging elements".

As can be seen from FIG. 3a, sensor unit 22 is mounted on a connecting piece 23 which mechanically connects the sensor unit 22 directly with the first frame component 12' (first leg). The reference element 21 is mounted on the base 11. A further sensor unit 22' is connected to the carriage 14 and enables measurements towards the further reference element 22' which is fixed to the portal legs 12',12". Both reference modules (each comprising a reference element and sensor unit) are separated connected to the CMM structure.

According to that first strategy mechanical coupling between the additional reference structural elements connected to the moving bodies is avoided.

The counter part (reference element 21,21') of the reference module is coupled to a relative moving part (here: the base 11 or the X-beam) of the original structure along the desired moving axis. While moving the CMM structure along one desired axis the sensing head 22,22' travels over the counter part 21,21' of the reference module and measures continuously the position or displacement along at least one orthogonal directions relative to the moving direction.

Therefore, preferably, no additional bearings are implemented at the exoskeleton. The sensing head can be mounted in a way to be directly connected (mechanically) to one moving axis and to the counterpart (reference element) for the next axis (compare FIG. 3b). This would mean a complete uncoupling of original structure vs. the "exoskeleton".

FIG. 3b depicts the sensor unit 22 being mounted on a connecting piece 24 which mechanically connects the sensor unit 22 with the second reference module (reference element 21') and thus indirectly with the frame component 12'.

Another way of fixing the sensing head is to fix it at a location onto the original structure where all bearing effects (hysteresis, non-repeatability, dynamics, temperature) could be measured as well as local deformation acting to that original body.

A reference element 21,21' can be connected mechanically to region where mostly global deflections take place (avoiding the influence of local deflections).

It basically means a physical model or additional sensors can be attached to take into account "global deflections" between one sensing element of the first axis against the following axis.

"Global deflections" geometrically happen after the local deflections at certain distances from local force inputs into a structural element (e.g. large leg, x-beam). Force inputs happen at bearing locations (fixation points) and at interfaces to other structural elements (e.g. from large leg to x-beam).

Preferably, the reference element 21,21' part of the reference module is coupled to the rest of the structure in a way to be robust against temperature effects (homogeneous and non-homogeneous) and against deflections of the original structure. In particular, by doing so, no additional forces beside inertia forces of the reference element 21,21' itself are introduced to the reference element 21,21' of the relative exoskeleton.

The reference element 21,21' might be fixed at both ends or near to both ends at specific points (Bessel points) or at or near only one end (see FIG. 3a). In between the reference element 21,21' might be supported in a way to counteract gravity effects. This support is therefore designed in a way to not introduce any force in a relevant way due to bending/deflection of the original CMM structure itself. Fixing at two points along the counterpart elements is preferably realised accordingly.

Furthermore, this coupling should be done in a way to couple at positions/points to the CMM structure which remove most of the local deformation effects.

Moreover, alternatively or additionally, there is provided strong mechanical coupling between additional structural elements of the reference module and the original CMM elements in moving direction. The additional structural elements in that case can be designed in a way to generate an additional guided element along one moving direction.

Thus, a robust local guided element is realised which preferably is of minimised mass and is able to separate from force impacts. The reference element 21,21' however can contain a guiding element (e.g. a tube and flat surface) and one or more bearings (e.g. cylindrical air bearing combined with a flat bearing) and a carriage coupled in the moving direction to the original structure. The bearing provides robustness and repeatability (no hysteresis, minimized non-repeatable runout).

The advantage against the approach of above is to avoid for long "scales" along the counterpart which might be difficult and/or expensive to produce and/or to fix properly to the counterpart. For that strategy only local sensing units have to be mounted on the counterpart.

Although in FIGS. 3a and 3b the reference modules are shown separate from the structural components (i.e. exposed), alternatively, these can be provided integrated in the respective structural component, e.g. into one or both of the portal legs 12',12" or into the connecting crossbeam.

Also in the case of rotational CMMs (e.g. Scara, not shown here) the reference modules can be integrated into or placed inside the structural components of the rotational CMM, e.g. linking a reference element or a sensor unit to one of the drives, spindles or bearings and/or axis.

The approaches of attaching the reference modules to the CMM structure of FIGS. 3a and 3b relate to all aspects of the present invention mentioned above or below, i.e. the reference modules can modularly be attached or replaced to the CMM, may provide absolute coordinate determination and can enable to compensate for dynamically induced errors (e.g. vibrations, resonances etc.) and/or temperature errors (deformations, dislocations, bending etc.). Moreover, internal deformations of the reference modules can be described and calculated using a physical model for respective reference modules.

Figure 4A:
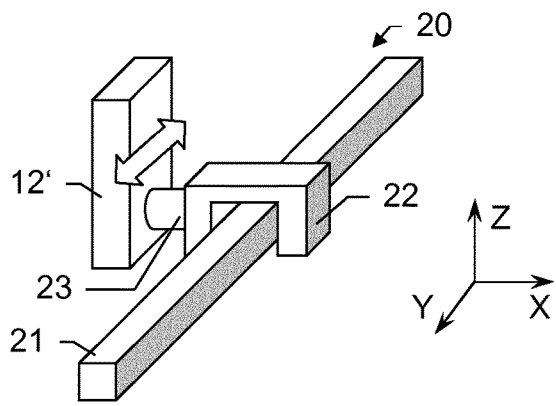
FIGS. 4a-b show embodiments of reference modules of a CMM.
Figure 4B:
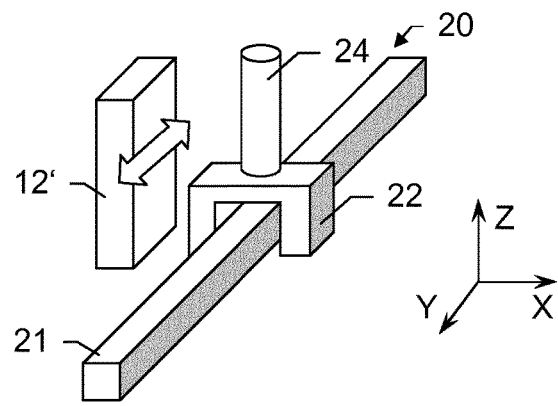

FIGS. 4a and 4b show two exemplary embodiments of a reference module 20 of the CMM depicted in FIGS. 3a and 3b. The reference module 20 comprises a beam-shaped reference element 21 which is mounted on the base of the CMM and a sensor unit 22 which is assigned to the reference element 21 and adapted to determine a relative position to the reference element 21. The reference element 21 extends in a first direction Y parallel to the movement direction of the first frame component 12.

In FIG. 4a the sensor unit 22 is mounted on a connecting piece 23 which mechanically connects the sensor unit 22 directly with the first frame component 12; this corresponds to the CMM setup of FIG. 3a. In FIG. 4b the sensor unit 22 is mounted on a connecting piece 23 which mechanically connects the sensor unit 22 with the second reference module and thus indirectly with the frame component 12; this corresponds to the CMM setup of FIG. 3b.

The reference element 21 and the sensor unit 22 are designed and arranged in such a way that at least a distance from the first reference element 21 to that frame component the sensor unit is attached is measurable. A difference between the measured distance and a nominal distance value indicates a displacement or a deformation of the first frame component 12. In addition, a current state of the reference element 21 and/or the sensor unit 22 is known (either from a describing model or by providing the reference module with respectively stable properties and bearings) for precise determination of the displacement or a deformation.

Figure 5:
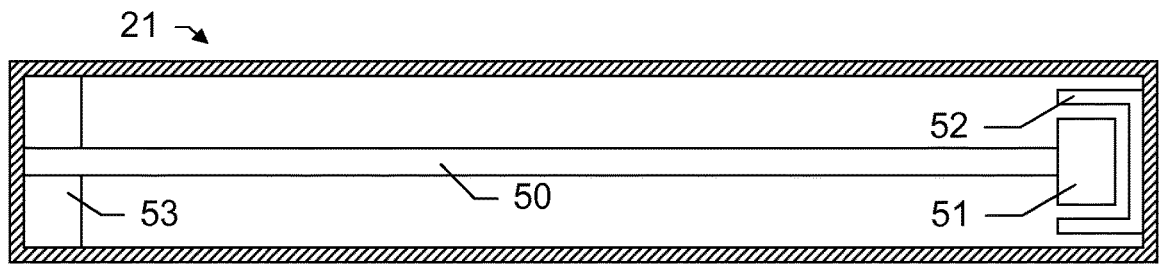
FIG. 5 shows an embodiment of a reference element.

FIG. 5 shows an exemplary embodiment of the reference element 21 in a cross-sectional view. The beam-shaped element is hollow and comprises an additional sensing head 52 which is fixed to a first end of the reference element's inner wall. A tubular element 50 is fixed in an insulated manner in a fixation 53 at the other end of the reference element 21 and extends towards the first end, where a relative position of an encoder element 51 of the tubular element 50 is detectable by the sensing head 52. The tubular element 50 is insulated from the reference element 21 and preferably is made from a material having a low CTE value. With this setup, expansion, contraction, bending or other dimensional changes of the reference element 21, e. g. due to temperature changes, are determinable.

Figure 6:
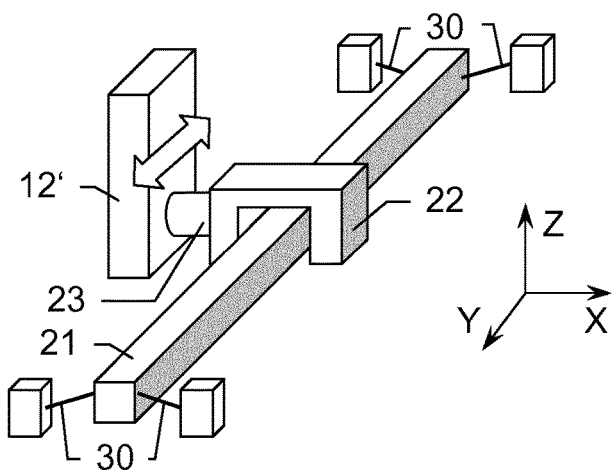
FIG. 6 shows a first exemplary embodiment of the fixation of the reference element.

FIG. 6 shows a further exemplary embodiment of the first reference module 20, the reference element 21 being mounted to the base by means of flexure based connections 30. The flexures allow the reference element 21 to expand or contract in the first direction Y, e. g. due to temperature changes, without any bending effects and lateral movements of the reference element 21 occurring.

FIGS. 7a-d show a further exemplary embodiment of the first reference module 20, the reference element 21 being mounted to the base by means of an isostatic three-point fixation 40.

Figure 7A:
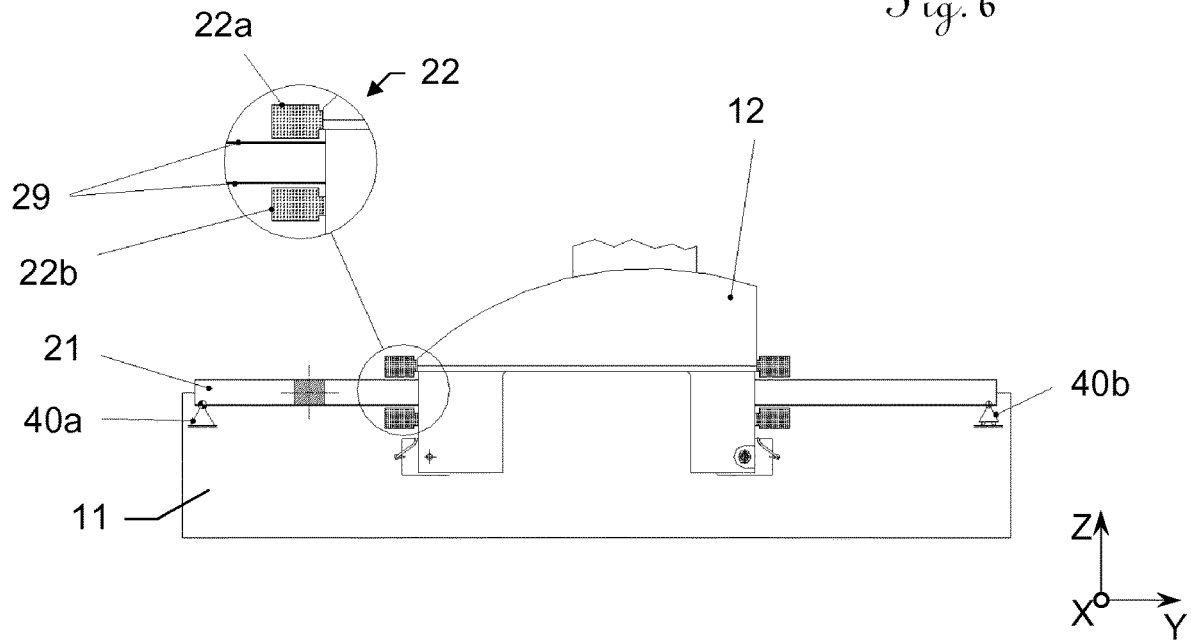

FIG. 7a shows this in a side view: The reference element 21 at a first end is fixed to the base 11 by an axial reference part 40a of the isostatic fixation, and at a second end by a support part 40b of the isostatic fixation. The reference element 21 comprises sensing scales 29 that are readable by the sensors 22a, 22b of the sensor unit 22 in order to determine a relative position between the reference element 21 and the sensor unit 22, and thus the first frame element 12 to which the sensor unit 22 is connected, particularly in six degrees of freedom (6DOF).

FIG. 7b shows the reference element 21 in a bottom view. At the axial reference part 40a the reference element 21 comprises a conical depression 41 and a rectangular depression 42; at the support part 40b it comprises a sphere 43. FIGS. 7c and 7d show the two ends of the reference element 21 in a cross-sectional view (dashed lines in FIG. 7b). FIG. 7c shows the first end comprising the axial reference part 40a. This end of the reference element 21 is supported by two spherical elements 44,45 contacting the reference element 21 at the conical depression 41 and at the rectangular depression 42 and resting on two support elements 46,47. FIG. 7d shows the second end comprising the support part 40b. This end of the reference element 21 is supported by a third support element 48 on which the sphere 43 rests.

This isostatic three-point fixation allows the reference element 21 to expand or contract in the first direction Y, e. g. due to temperature changes, without any bending effects of the reference element 21 occurring.

It is to be understood in sense of the present invention that the invention is not limited to the embodiments as shown above, but numerous modifications in particular regarding the shape of the reference element and the design of the sensor unit are possible which provide a relative position and/or orientation measurement.

What is claimed is:

1. A method for providing coordinate measurement with a coordinate measuring machine, the method comprising:
    initially calibrating a stand-alone reference module having a reference element with a defined scaling, by:
        measuring physical properties of the reference element with reference to respective absolute standards, the stand-alone reference module being provided in an un-mounted state relative to the coordinate measuring machine, and
        deriving calibration data for the stand-alone reference module based on the measurement, the calibration data providing information about a particular position of a sensor unit relative to the reference element depending on a respectively detected portion of the scaling, and
    subsequently attaching the stand-alone reference module to the coordinate measuring machine and providing the calibration data to a controlling and processing unit of the coordinate measuring machine such that the stand-alone reference module provides determination of an orientation value by means of the sensor unit representing an angle orientation of the sensor unit relative to the reference element, wherein the reference element is attached to a first and the sensor unit to a second structural component of the coordinate measuring machine, wherein the reference element and the sensor unit are attached to the coordinate measuring machine in a basically unloaded manner.

2. The method according to claim 1, wherein the stand-alone reference module is attached in addition to a standard encoding unit of the coordinate measuring machine which unit provides the measurement of coordinates to which the coordinate measuring machine is designed for.

3. The method according to claim 1, wherein the orientation value determinable by means of the sensor unit represents the orientation of the sensor unit relative to the reference element in at least two degrees of freedom.

4. The method according to claim 1, wherein the stand-alone reference module provides determination of movement information which relates to relative machine movement orthogonal to regular movement the coordinate measuring machine is designed for.

5. The method according to claim 1, wherein the sensor unit is part of the stand-alone reference module and is adapted for detecting the scaling of the reference element.

6. The method according to claim 1, further comprising:
    detecting portions of the scaling at particular points along the reference element with the sensor unit;

assigning the detected portions of the scaling to respective relative positions of the sensor unit relative to the reference element; and deriving the calibration data for the stand-alone reference module based on the detection.

7. The method according to claim 1, wherein the reference element is designed as an elongated structure, wherein the scaling provides information about a position along the structure and about an orientation relative to the structure.

8. The method according to claim 1, wherein the stand-alone reference module is attached to the coordinate measuring machine so that it provides:

determination of the orientation value with reference to at least one axis of the coordinate measuring machine; or information about a structural deformation of at least a part of the coordinate measuring machine.

9. The method according to claim 1, wherein the reference element is attached such that the reference element extends at least substantially parallel to one of the linear machine axis (X,Y,Z).

10. The method according to claim 1, wherein the reference element is designed for providing positional information of rotational machine movements.

11. The method according to claim 1, further comprising:

providing a look-up table comprising position or orientation values for a relative position or orientation of the sensor unit to the reference element, wherein the position or orientation values are assigned to particular detection signals representing respective portions of the scaling.

12. The method according to claim 11, wherein generating the look-up table is based on the calibration data.

13. A stand-alone reference module being adapted to provide a measurement with a coordinate measuring machine, the stand-alone reference module comprising:

a reference element with a defined scaling and a sensor unit, wherein the stand-alone reference module is configured to be calibrated in a stand-alone manner, where stand-alone manner means that the stand-alone reference module is provided in an un-mounted state relative to the coordinate measuring machine, by the sensor unit measuring physical properties of the scaling with reference to respective absolute standards and deriving calibration data for the stand-alone reference module based on the measurement, wherein the calibration data provide information about a particular positioning of the sensor unit relative to the reference element depending on a respectively detected portion of the scaling, and wherein the stand-alone reference module is configured to be attached to the coordinate measuring machine, wherein the stand-alone reference element is attachable to a first and the sensor unit is attachable to a second structural component of the coordinate measuring machine, and wherein in an attached state, the stand-alone reference module and the calibration data are designed to provide orientation values representing angle orientations of the sensor unit relative to the stand-alone reference element.

14. The stand-alone reference module according to claim 13, wherein the stand-alone reference module is attached in addition to a standard encoding unit of the coordinate measuring machine which unit provides the measurement of coordinates to which the coordinate measuring machine is designed for.

15. The stand-alone reference module according to claim 13, wherein the orientation value determinable by means of the sensor unit represents the orientation of the sensor unit relative to the reference element in at least two degrees of freedom.

16. The stand-alone reference module according to claim 13, wherein the stand-alone reference module provides determination of movement information which relates to relative machine movement orthogonal to regular movement the coordinate measuring machine is designed for.

17. The stand-alone reference module according to claim 13, wherein the sensor unit is part of the stand-alone reference module and is designed and arranged for detecting at least a part of the scaling.

18. The stand-alone reference module according to claim 13, wherein the stand-alone reference module comprises an attaching unit matching with a corresponding attaching unit at the coordinate measuring machine, wherein the attaching unit provides modular mounting and dismounting of the reference element or the sensor unit with defined position or orientation relative to the coordinate measuring machine.

19. A coordinate measuring machine comprising:

a base;

a probe head for approaching the measurement point; and a stand-alone reference module including:

a reference element with a defined scaling and a sensor unit, wherein the stand-alone reference module is configured to be calibrated in a stand-alone manner, where stand-alone manner means that the reference module is provided in an un-mounted state relative to the coordinate measuring machine, by the sensor unit measuring physical properties of the scaling with reference to respective absolute standards and deriving calibration data for the reference module based on the measurement, wherein the calibration data provide information about a particular positioning of the sensor unit relative to the reference element depending on a respectively detected portion of the scaling, wherein the stand-alone reference module is configured to be attached to the coordinate measuring machine, wherein the stand-alone reference element is attachable to a first and the sensor unit is attachable to a second structural component of the coordinate measuring machine, and wherein the machine structure provides linking the probe head to the base, wherein the reference element is attached to the first and the sensor unit is attached to the second structural component of the coordinate measuring machine, wherein a controlling and processing unit of the coordinate measuring machine comprises the set of calibration data, and wherein the stand-alone reference module and the calibration data are designed to provide orientation values representing angle orientations of the sensor unit relative to the reference element.

20. The coordinate measuring machine of claim 19, the coordinate measuring machine wherein at least one drive mechanism for providing movability of the probe head relative to the base.

21. The coordinate measuring machine of claim 19, wherein the stand-alone reference element and the sensor unit are attached to the coordinate measuring machine in an unloaded manner.

* * * * *